(12) United States Patent
Tsay (10) Patent No.: US 7,721,771 B2
(45) Date of Patent: May 25, 2010

(54) AUTOMATIC SUCTION STRUCTURE OF A VACUUM CONTAINER

(75) Inventor: Shiu-Chu Tsay, Taiping (TW)

(73) Assignee: Ming-Shi Chou, Da'an Township, Taichung County (TW)

( * ) Notice: Subject to any disclaimer, the term of this patent is extended or adjusted under 35 U.S.C. 154(b) by 1035 days.

(21) Appl. No.: 11/440,397

(22) Filed: May 25, 2006

(65) Prior Publication Data

US 2007/0272325 A1 Nov. 29, 2007

(51) Int. Cl.
*B65B 31/04* (2006.01)

(52) U.S. Cl. ............................. 141/65; 141/83; 141/95; 215/262

(58) Field of Classification Search ............. 141/8, 141/39, 65, 66, 83, 94, 95, 192, 198; 220/203.01, 220/212; 215/228, 311, 262; 99/472
See application file for complete search history.

(56) References Cited

U.S. PATENT DOCUMENTS

| | | | | |
|---|---|---|---|---|
| 5,803,282 | A * | 9/1998 | Chen et al. | 215/228 |
| 5,806,575 | A * | 9/1998 | Tsay | 141/65 |
| 6,662,831 | B2 * | 12/2003 | Chen | 141/65 |
| 6,830,081 | B1 * | 12/2004 | Chen | 141/65 |
| 6,968,870 | B1 | 11/2005 | Tsay | |
| 7,040,356 | B2 * | 5/2006 | Tarlow | 141/65 |
| 2004/0256021 | A1 * | 12/2004 | Chen | 141/65 |
| 2006/0138068 | A1 * | 6/2006 | Tsai et al. | 215/228 |

* cited by examiner

*Primary Examiner*—Gregory L Huson
*Assistant Examiner*—Jason K Niesz
(74) *Attorney, Agent, or Firm*—Egbert Law Offices PLLC (57) ABSTRACT

The present invention provides an improved automatic suction structure of a vacuum container. The structure includes a pumping unit, a power supply, a vacuum releaser and a vacuum detector. The structure allows for automatic air suction, automatic detection, safety power disconnection and continuous vacuuming as well as easy operation. The present invention guarantees improved quality and convenient operation.

7 Claims, 12 Drawing Sheets

AUTOMATIC SUCTION STRUCTURE OF A VACUUM CONTAINER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an improved automatic suction structure of a vacuum container, and more particularly to an automatic suction structure of vacuum container which comprises of a power supply, a pumping unit, a vacuum detector and a vacuum releaser. The container allows for automatic air suction, automatic detection, safety power disconnection and continuous vacuuming as well as easy operation.

BACKGROUND OF THE INVENTION

Conventional airtight containers are commonly used to accommodate food products or precision devices. While a vacuum pump extracts air from the container via a one-way valve, a negative pressure for reliable adsorption of container is formed. However, since it is difficult for a vacuum pump to maintain air tightness with the container during the actual sealing and operation, the air suction effect is often poor, or leads to failure due to air leakage.

Figure 1:
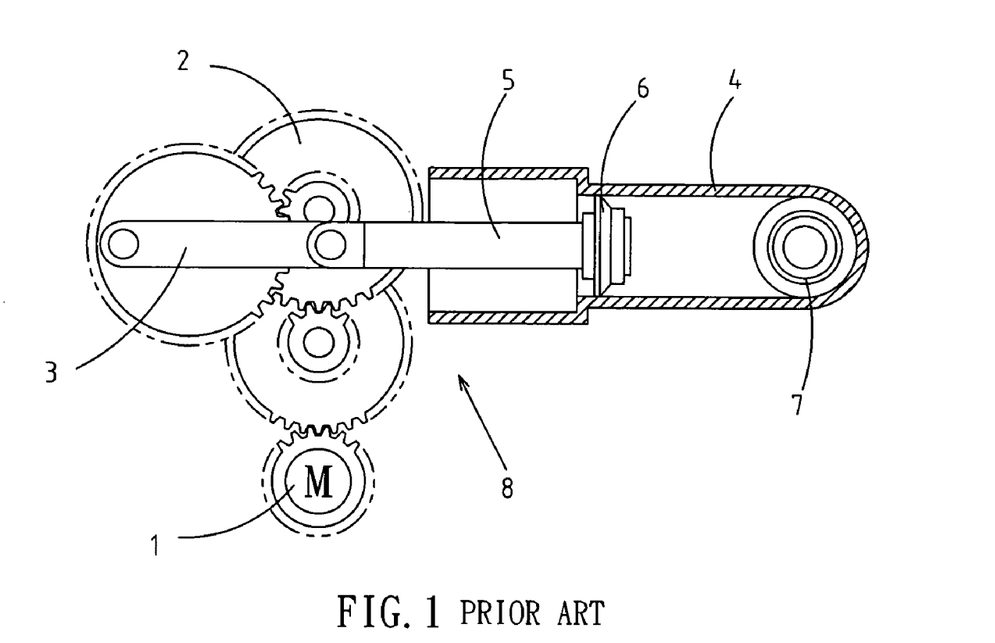
FIG. 1 shows a schematic view of the operation of the conventional suction device.
Figure 2:
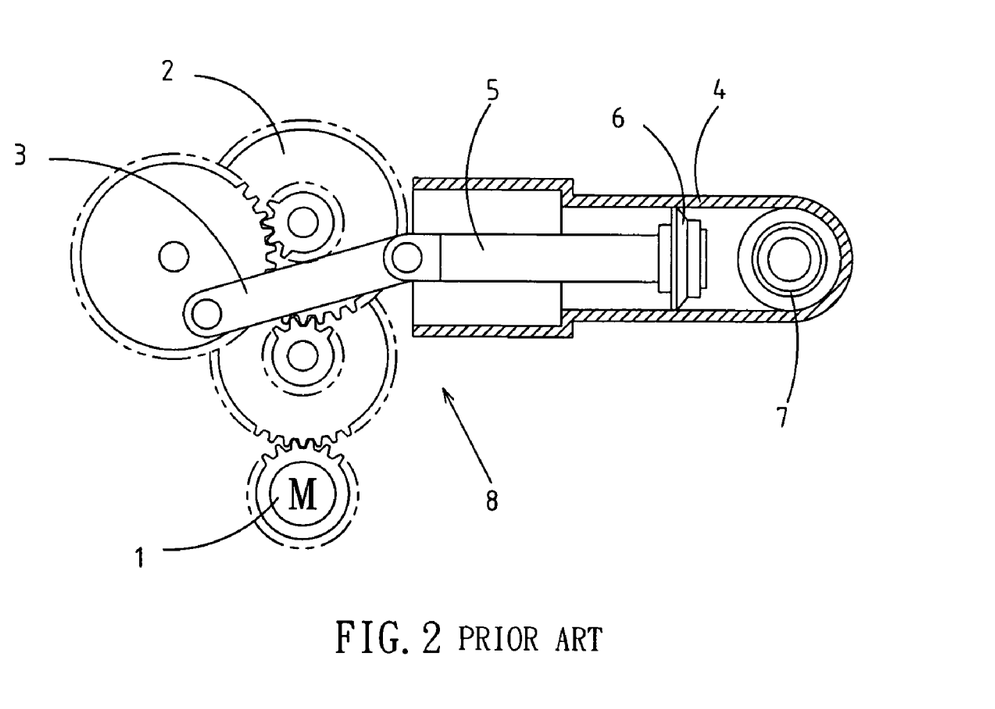
FIG. 2 shows another schematic view of the operation of the conventional suction device.

For a typical structure of the prior art, U.S. Pat. No. 6,968,870, entitled "Automatic Suction Structure of a Vacuum Container" is shown in FIGS. 1-2. The suction device 20 comprises a motor 21, a deceleration gear set 22 driven by the motor 21, a connection rod 23 actuated by the deceleration gear set 22, a suction pump 24, a piston rod 25 disposed slidably in the suction pump 24 such that one end of the piston rod 25 is fastened with the connection rod 23, a piston 26 fastened with other end of the piston rod 25, and an air-exhausting valve 27.

Problems are found from such a prior art structure during actual application. First, due to complexity of the air extractor structure and assembly procedure of deceleration gear set 2 and coupled actuating arm 3, the assembly requires a time-consuming and tedious process. Time is wasted and costs the favor of the operators.

Since the air extractor is equipped with continuously-running deceleration gear sets 2, the swinging motion of gear sets will lead to defects in the air extractor 8.

Thus, to overcome the aforementioned problems of the prior art, it would be an advancement in the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

There are shortcomings in the prior art as discussed herein. The present invention is a suction structure of a vacuum container 90 comprising a pumping unit 60, power supply 50, vacuum releaser 80 and a vacuum detector 70. Thus, container 90 allows for automatic air suction, automatic detection, safety power disconnection, continuous vacuuming, as well as easy operation. Another benefit of the present invention is that the suction pump 63 extracts air in the container via a suction pipe 61 and a check valve 62, thereby achieving easy operation with a simple structure.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

FIGS. 3-13 depict preferred embodiments of an automatic suction structure of vacuum container of the present invention, which are provided only for explanatory purposes.

Figure 3:
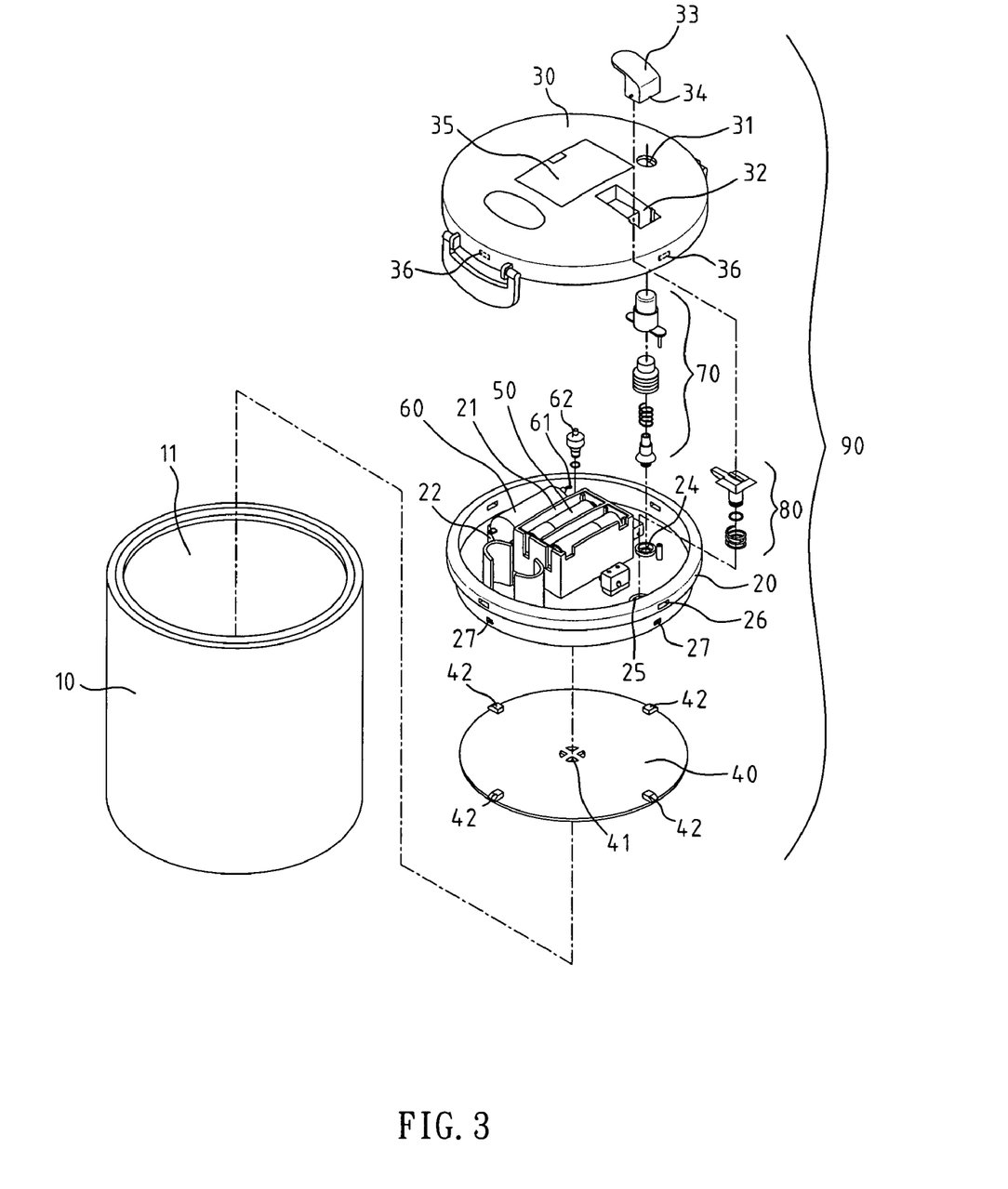
FIG. 3 shows an exploded perspective view of the suction structure of a vacuum container of the present invention.
Figure 4:
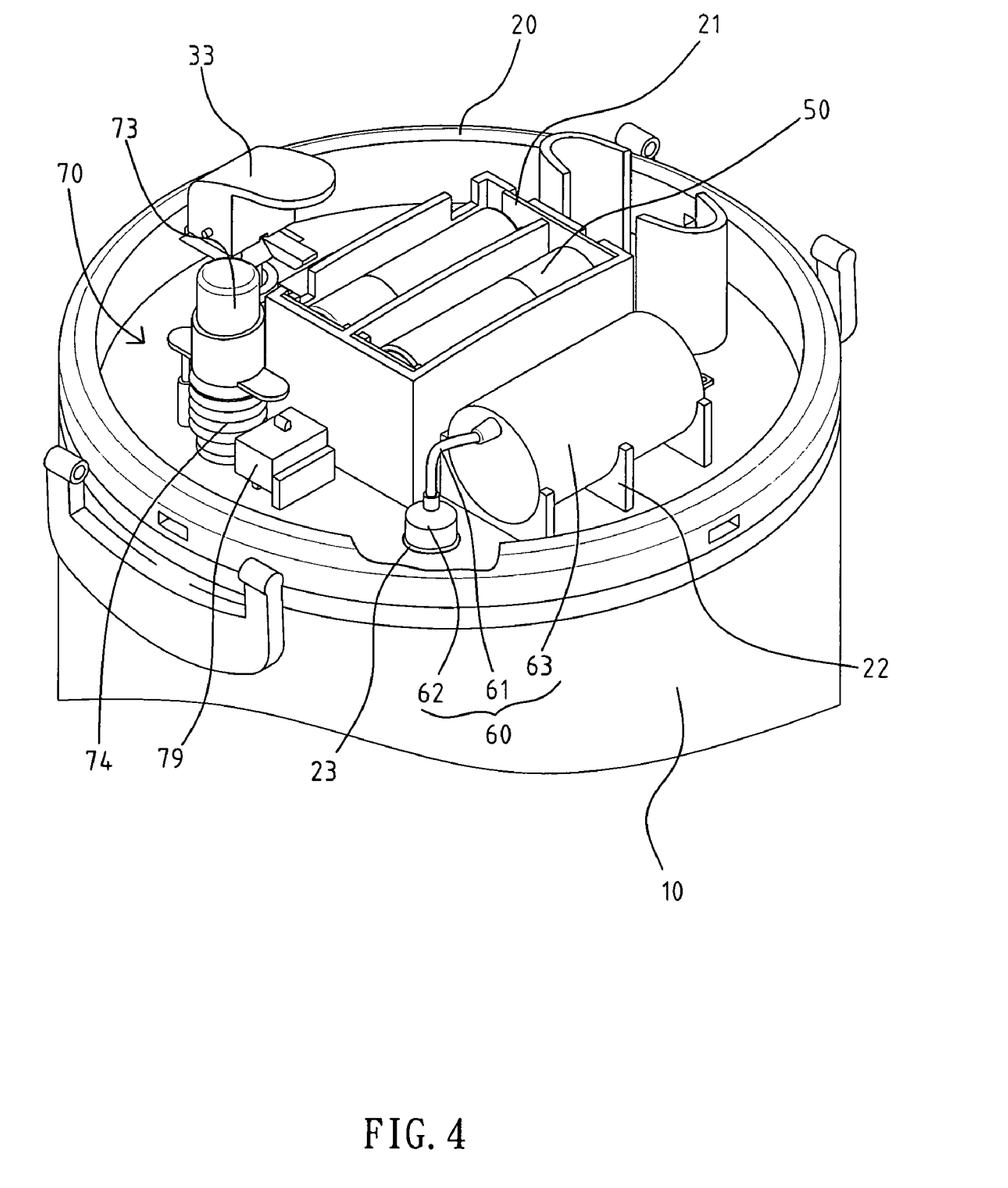
FIG. 4 shows a perspective view of the suction structure of a vacuum container of the present invention.
Figure 9:
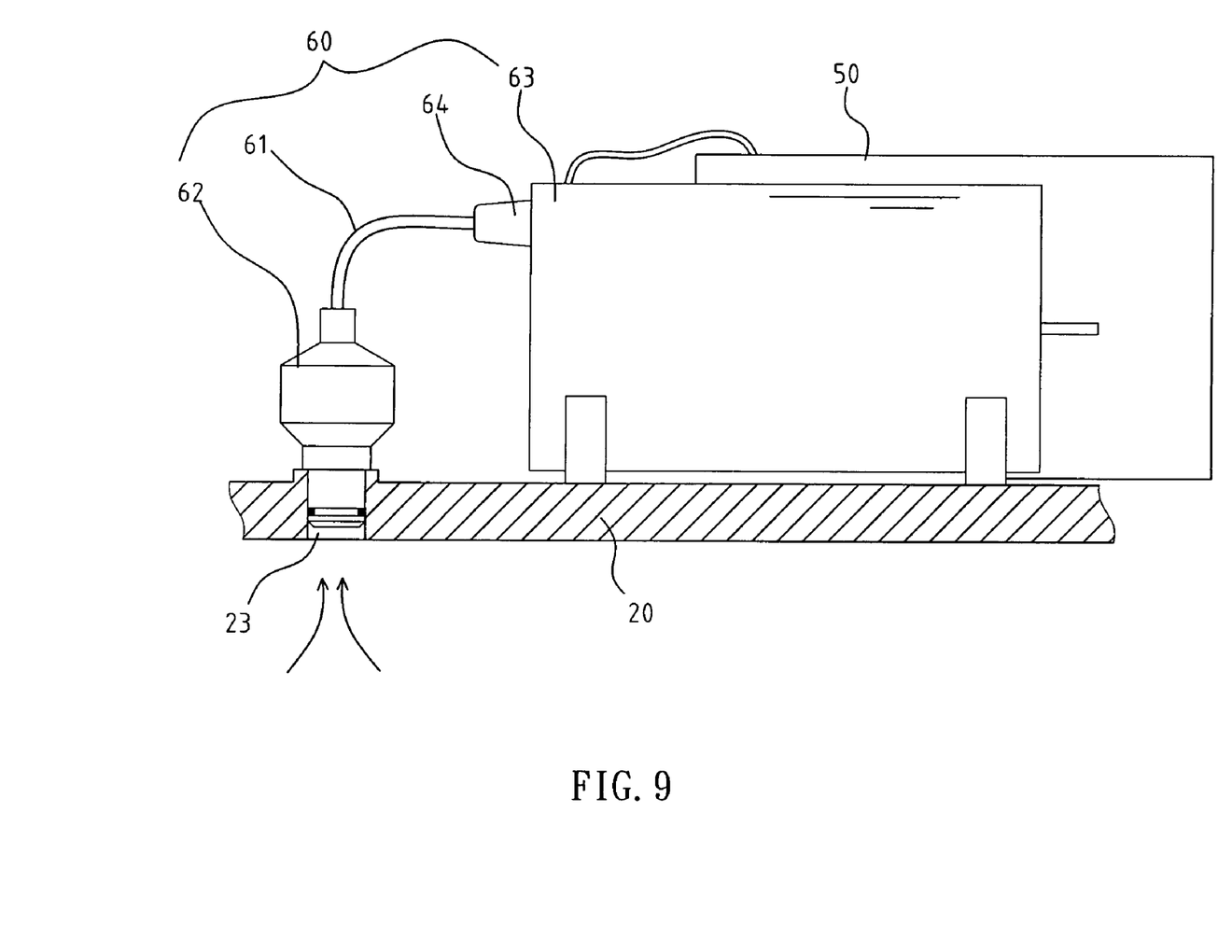
FIG. 9 shows a partial sectional and elevation view of the pumping unit of the present invention.

As shown in FIGS. 3, 4, 9, the present invention comprises a vacuum container 10, which has an open end 11 facing upwards.

There is a container 90, which is comprised of a middle container 20, an upper container 30 and a lower plate 40. The container 90 is mounted into open end 11 of vacuum container 10. A power supply fixer 21 is placed at a preset location of middle container 20, and a suction pump fixer 22 is placed at the other side. A suction hole 23 is placed at one side of suction pump fixer 22, as shown in FIG. 9. A discharge hole 25 and a detection hole 24 are separately placed at one side of middle container 20, while locking parts 27 are arranged around the bottom of middle container 20. Linking parts 26 are arranged around the top. Liner locks 36 are arranged around an inner surface of upper container 30, such that the linking parts 26 are mounted onto the middle container 20. A discharger fixer 32 is mounted onto a preset location of upper container 30. The discharger fixer 32 is fitted with a discharger 33, at bottom of which there is a slideway 34. A vacuum detection punch hole 31 is mounted onto a preset location of upper container 30, and a lower plate 40 is rightly installed at the bottom of middle container 20. There is a hole 41 at the center of lower plate 40, and some snappers 42 are arranged around the lower plate 40 to match locking parts 27 of middle container 20.

A power supply 50 is located in the power supply fixer 21 of the middle container 20. The power supply 50 may be a battery. A power supply side cover 35 is mounted onto a location of upper container 30 matching the power supply 50.

A pumping unit 60, as shown in FIG. 9, is located onto a suction pump fixer 22 of the middle container 20. The pumping unit 60 comprises a suction pump 63, a suction pipe 61 and a check valve 62. Suction connector 64 of the suction pump 63 is air-tightly linked to suction hole 23 of middle container 20 via a suction pipe 61 and a check valve 62. Suction pump 63 electrically activates or deactivates pumping unit 60 through a power supply 50.

Figure 5:
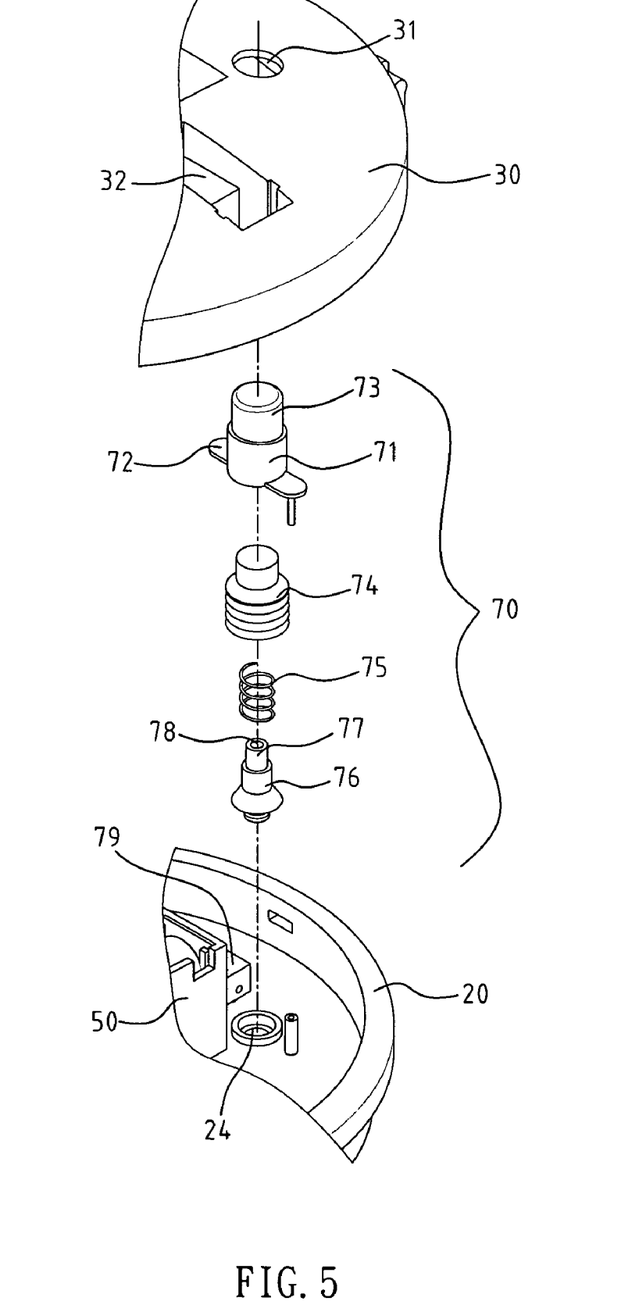
FIG. 5 shows an exploded perspective view of the vacuum detector of the present invention.
Figure 6:
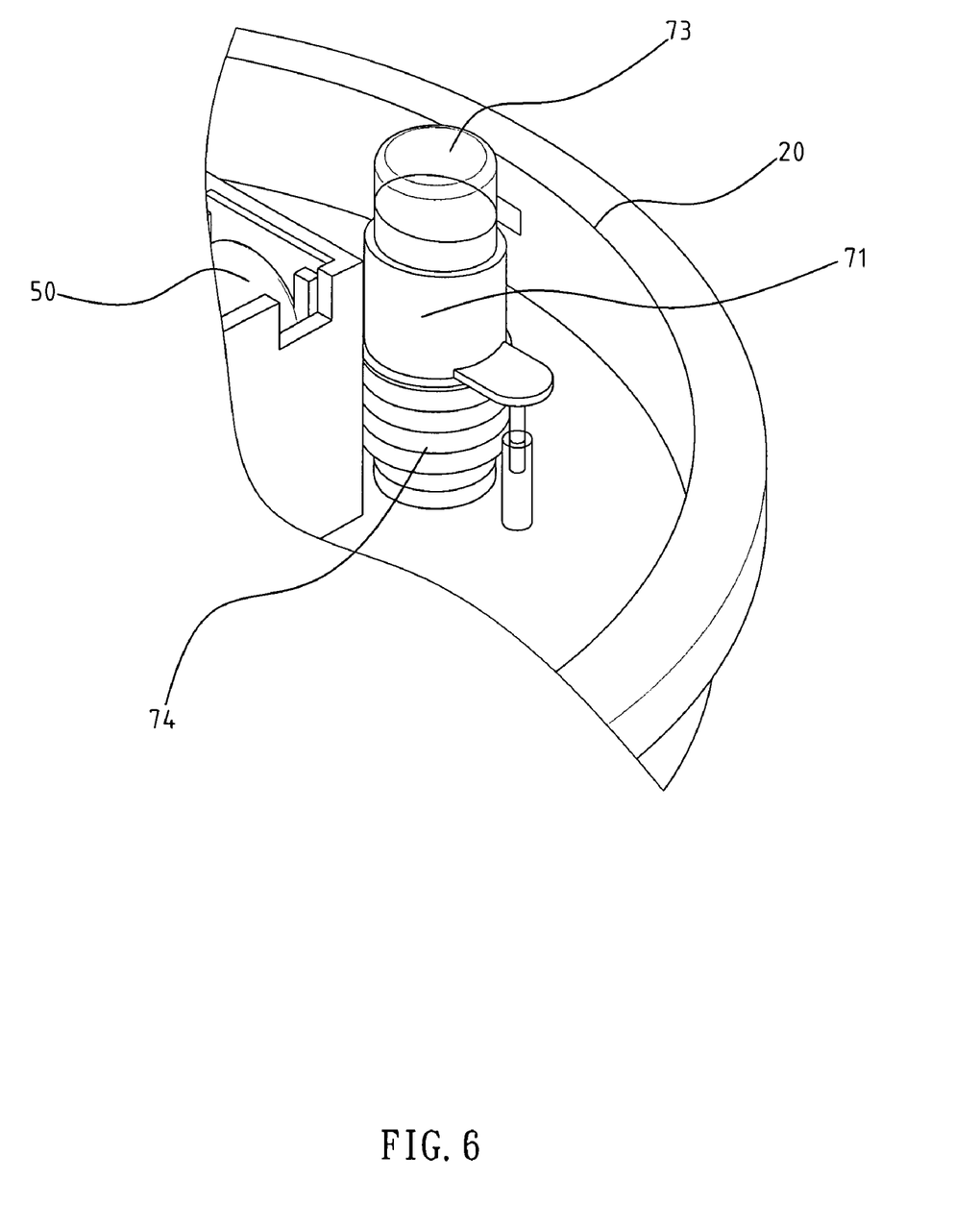
FIG. 6 shows a perspective view of the vacuum detector of the present invention.

A vacuum detector 70, as shown in FIGS. 5, 6, 9, is mounted into detection hole 24 of the middle container 20. The vacuum detector 70 comprises a vacuum detector unit 71, a flexible pressure cylinder 74, a spring 75, a base 76 and a circuit breaker 79. The circuit breaker 79 is located at middle container 20 to switch-on/off the power supply 50. The base 76 is fitted into detection hole 24 of middle container 20, and retractable part 77 of base 76 is provided with a guide hole 78, which is smoothly linked to the detection hole 24. A spring 75, a flexible pressure cylinder 74 and a vacuum detector unit 71 are sequentially sleeved into preset locations corresponding to the base 76. At the end of vacuum detector unit 71 is a retractable end 73, which can be inserted into vacuum detection punch hole 31 of upper container 30. At one side of vacuum detector unit 71, there is an actuating end 72, which permits flexible pressure cylinder 74 to generate downward suction via inner vacuum pressure of detection hole 24. The flexible pressure cylinder 74 is closely fastened into vacuum detector unit 71, such that actuating end 72 of vacuum detector unit 71 can move downwards to activate circuit breaker 79.

Figure 7:
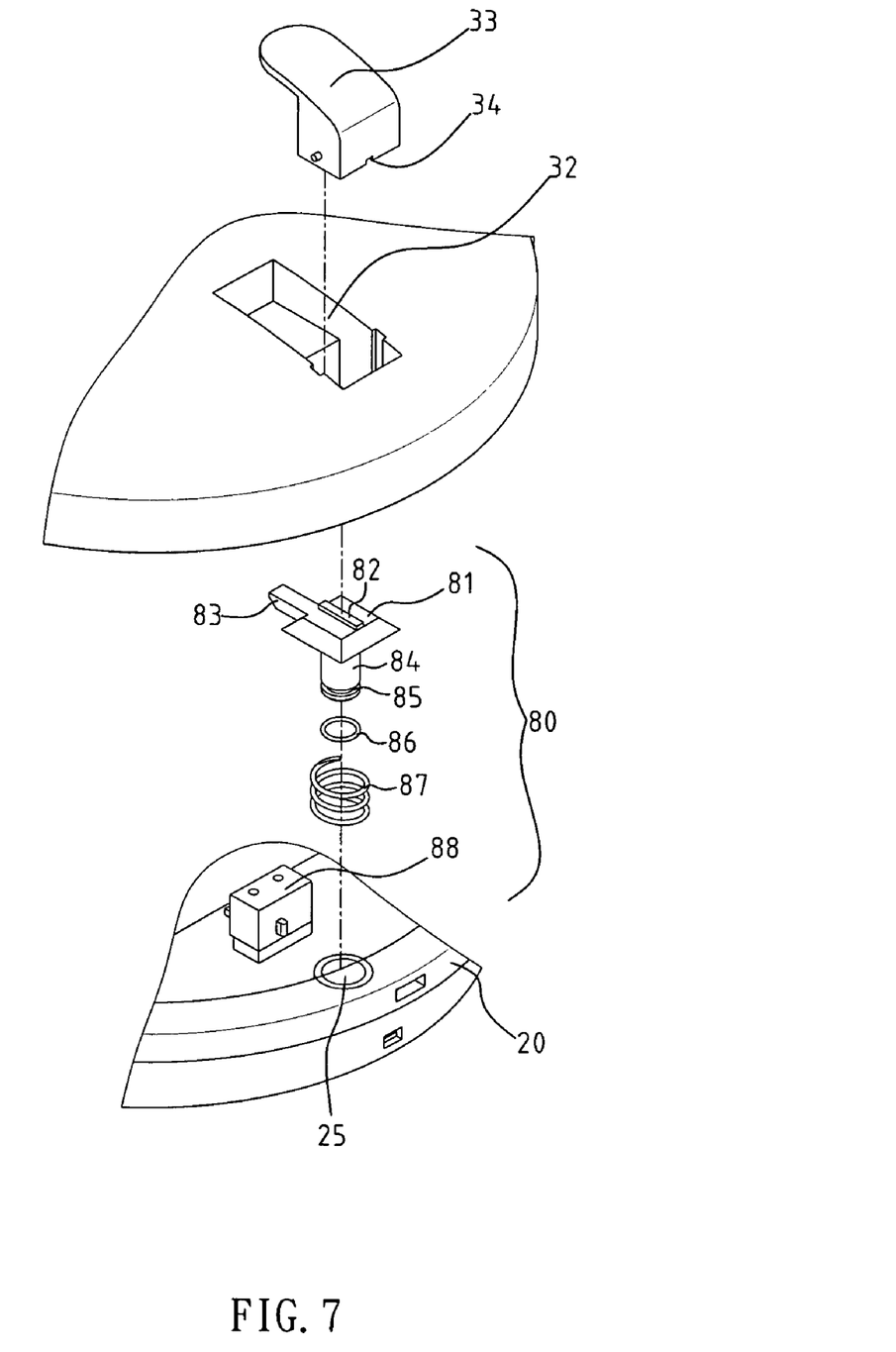
FIG. 7 shows an exploded perspective view of the vacuum releaser of the present invention.
Figure 8:
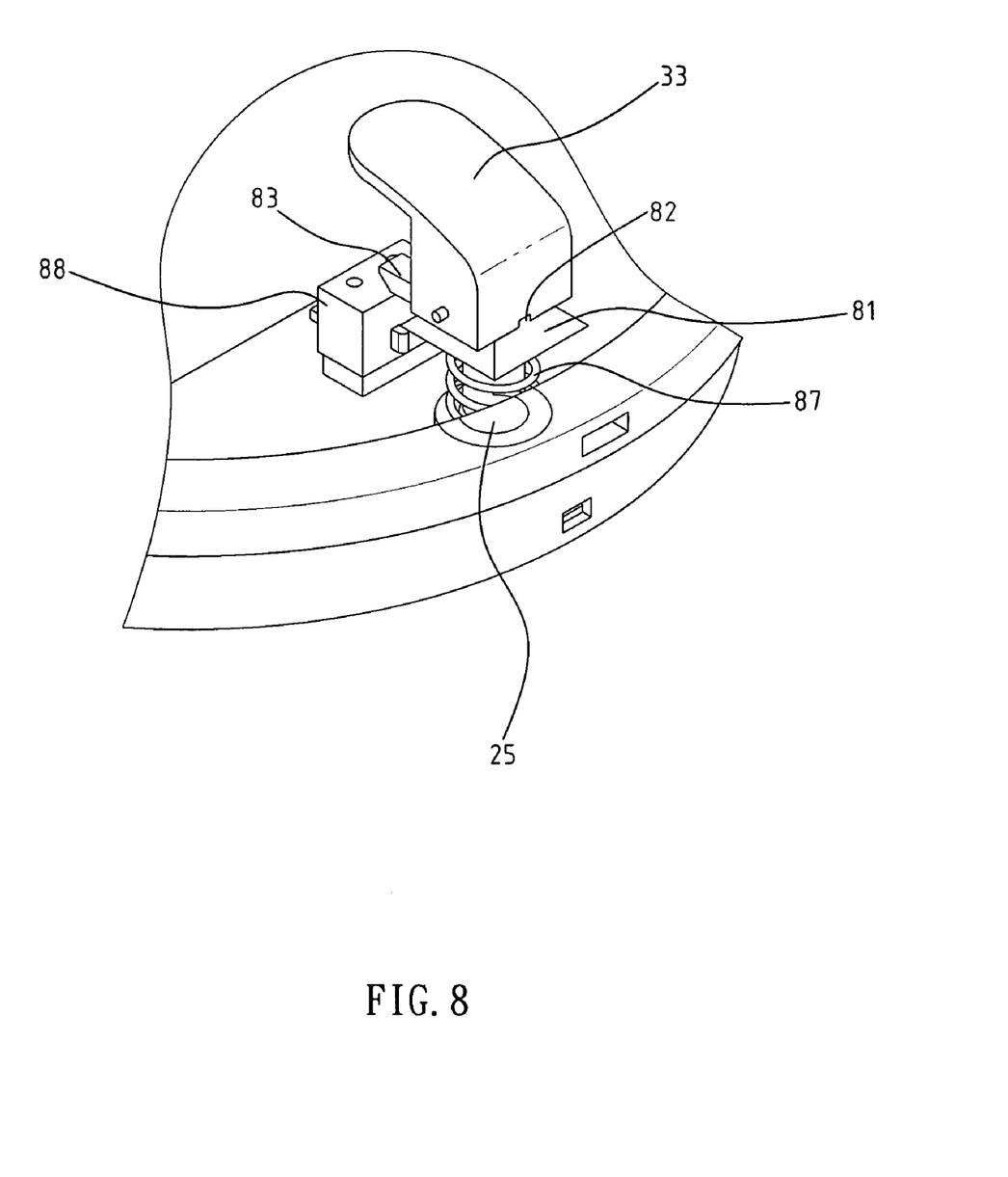
FIG. 8 shows a perspective view of the vacuum releaser of the present invention.

A vacuum releaser 80, as shown in FIGS. 7, 8, 9, is located between discharger 33 of upper container 30 and discharge hole 25 of middle container 20. The vacuum releaser 80 comprises an interlock 81, a switch 88, a sealer 86 and a return spring 87, of which a guide groove 82 is located at top of interlock 81 opposite to slideway 34 of discharger 33. With the knob of discharger 33, slideway 34 at the bottom of discharger 33 can swing downwards and apply an oblique force to guide groove 82 of interlock 81, such that the interlock 81 moves downwards. At one side of interlock 81, there is a trigger unit 83 corresponding to switch 88. The switch 88 is located on middle container 20 and is used to switch-on/-off power supply 50. At the bottom of interlink, there is a guide post. 84, which can be rightly guided into discharge hole 25 of middle container 20. A circular groove 85 is fixed at a preset location of guide post 84, where a sealer 86 can be located. A return spring 87 is sleeved into the guide post 84 as a support around discharge hole 25. When the discharger 33 is pressurized downwards, the sealer 86 of interlock 81 will separate from discharge hole 25. The return spring 87 enables interlock 81 to move upwards, such that the sealer 86 of guide post 84 of interlock 81 is returned into discharge hole 25 for an air-tight state. With the swinging control of discharger 33, the vacuum releaser 80 could open or close air-tight discharge hole 25, and switch-on/-off the power supply 50.

Based upon above-specified structural design, the present invention is operated as described herein.

Figure 10:
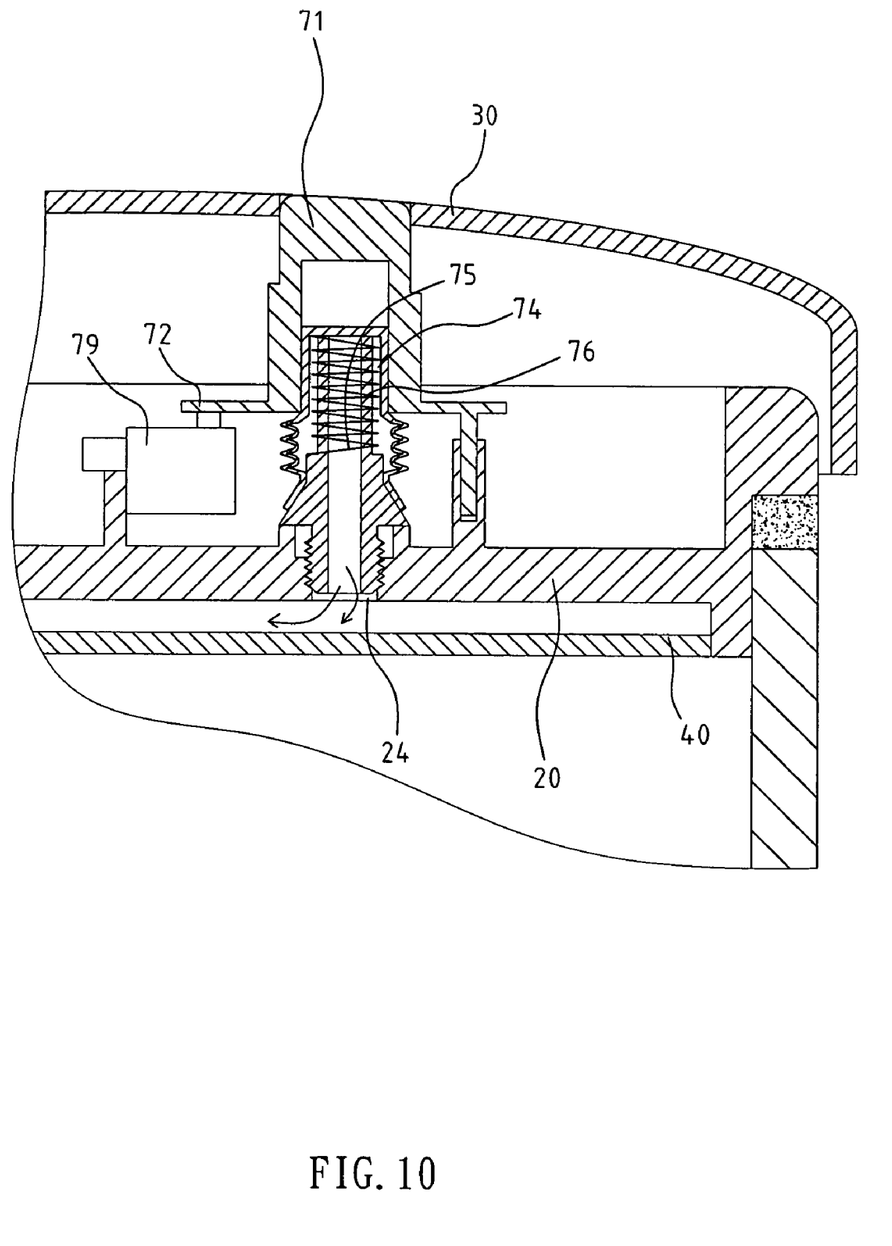
FIG. 10 shows a sectional view of the operation of the vacuum detector of the present invention.
Figure 11:
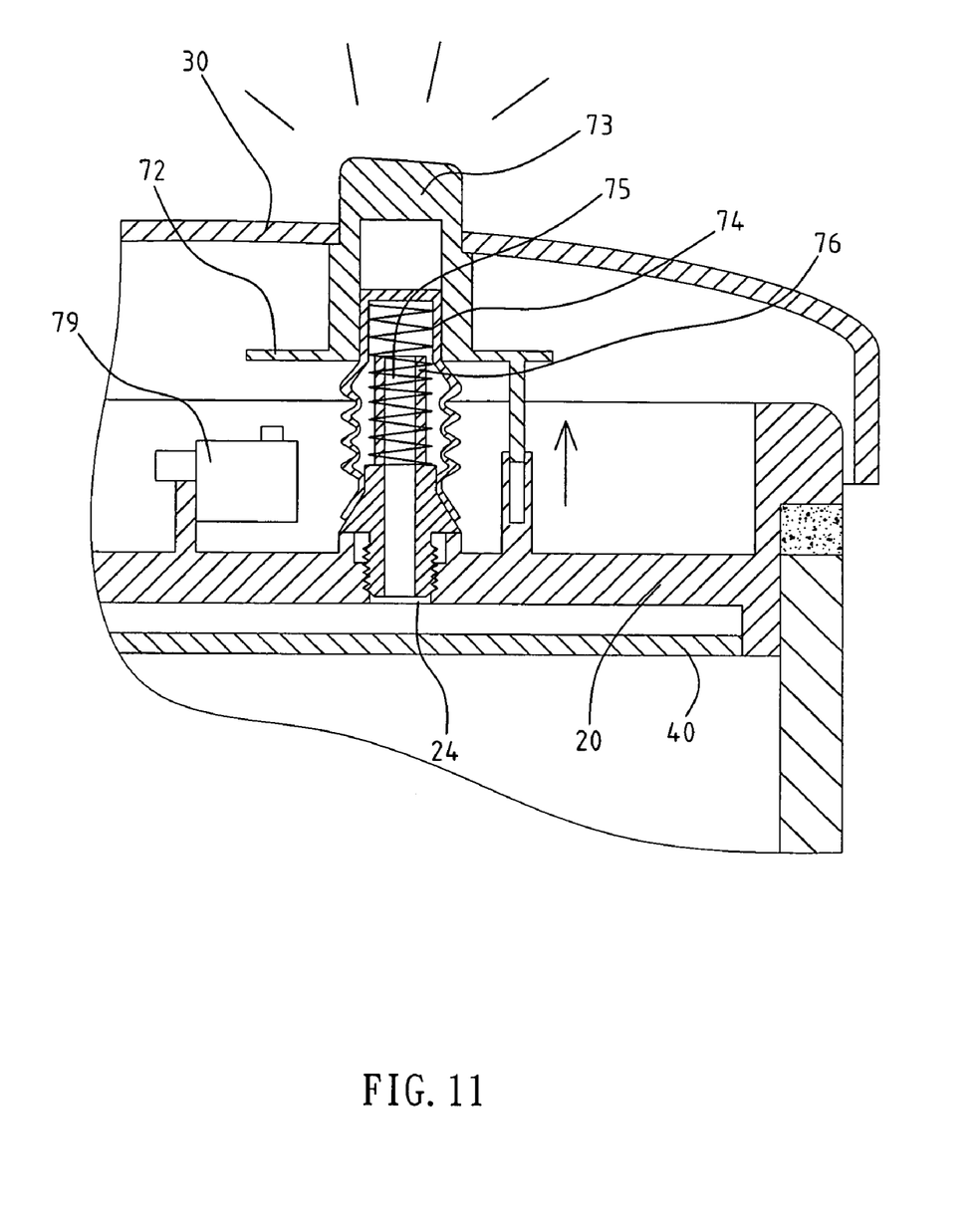
FIG. 11 shows another sectional view of the operation of the vacuum detector of the present invention.

Referring to FIGS. 9-11, when pumping unit 60 is activated by power supply 50, the pumping unit 60 is linked to one end of suction pipe 61 via a suction connector 64, check valve 62, and suction hole 23 of middle container 20 at the other end of suction pipe 61. As such, air within vacuum container 10 is extracted upwards via hole 41 of lower plate 40. When air flows through suction hole 23, a check valve 62 of suction hole 23 permits only a one-way air extraction. When pumping unit 60 continuously operates to generate a saturated vacuum within the vacuum container 10, the detection hole 24 within vacuum detector 70 will generate a vacuum suction force. With the help of vacuum suction force, the guide hole 78 at retractable part 77 of base 76 will drive flexible pressure cylinder 74 for downward suction. And, one end of flexible pressure cylinder 74 is tightly fastened into the vacuum detector unit 71, such that flexible pressure cylinder 74 can move synchronously with vacuum detector unit 71. Since retractable end 73 at the end of vacuum detector unit 71 is extended into vacuum detection punch hole 31 of upper container 30, the users can identify easily vacuum state within vacuum container 10 via the retractable end 73. Moreover, an actuating end 72 is extended from the lateral flange of vacuum detector unit 71. In the case of saturation within vacuum container 10, the flexible pressure cylinder 74 will suck air continuously via vacuum suction force. Meanwhile, the vacuum detector unit 71 moves downwards, and actuating end 72 will trigger the circuit breaker 79 to switch off power supply 50 for higher energy efficiency. In the absence of vacuum and vacuum suction force of the vacuum container 10, the flexible pressure cylinder 74 is returned to a normal state, and the spring 75 will support a flexible pressure cylinder 74 and a coupled vacuum detector unit 71 (as shown in FIG. 11). In such case, actuating end 72 of vacuum detector unit 71 has moved upwards, and also is separated from circuit breaker 79, such that the power supply 50 enables the pumping unit 60 to run continuously and maintain vacuum state of vacuum container 10.

Figure 12:
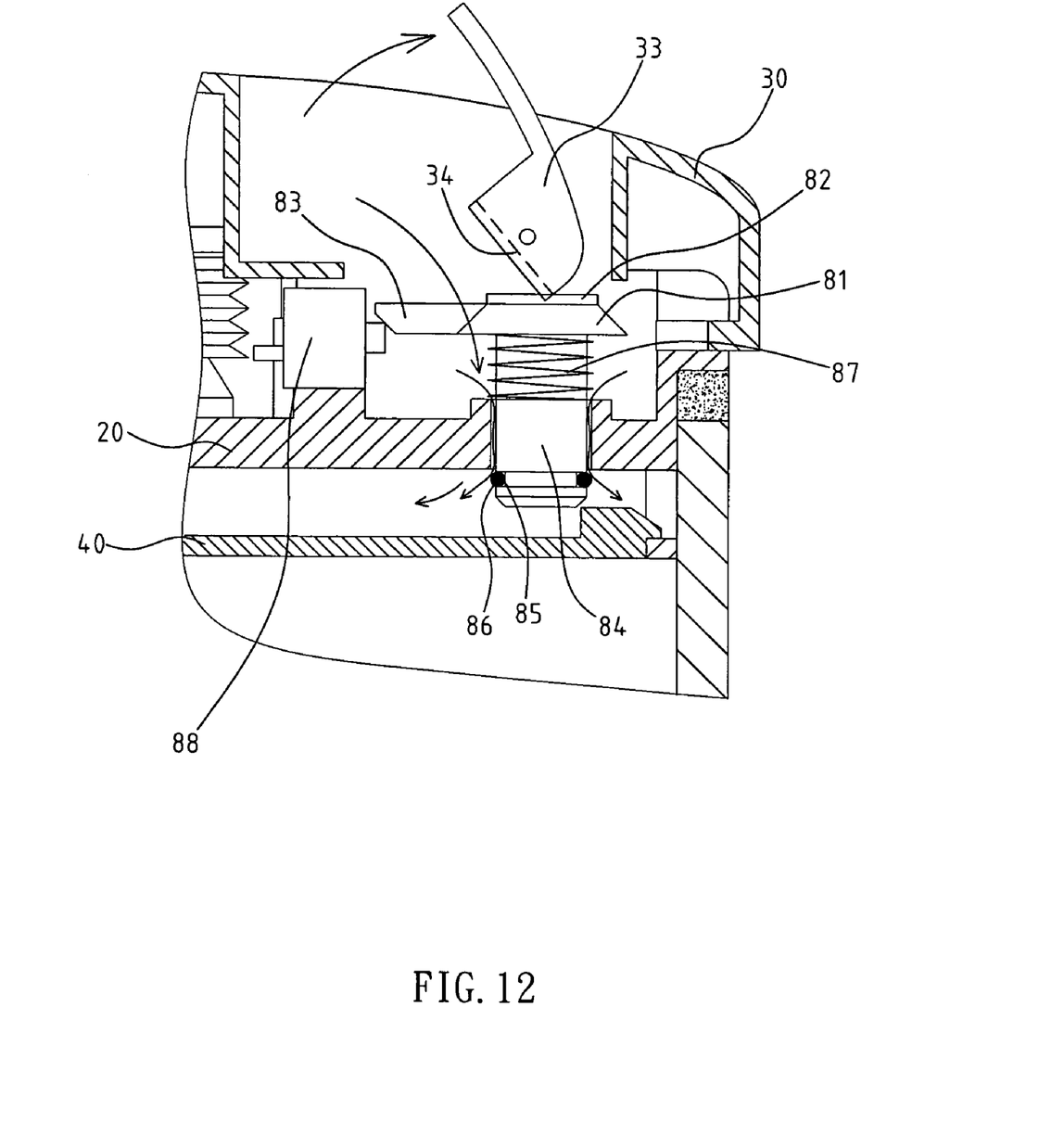
FIG. 12 shows a sectional view of the operation of the vacuum releaser of the present invention.
Figure 13:
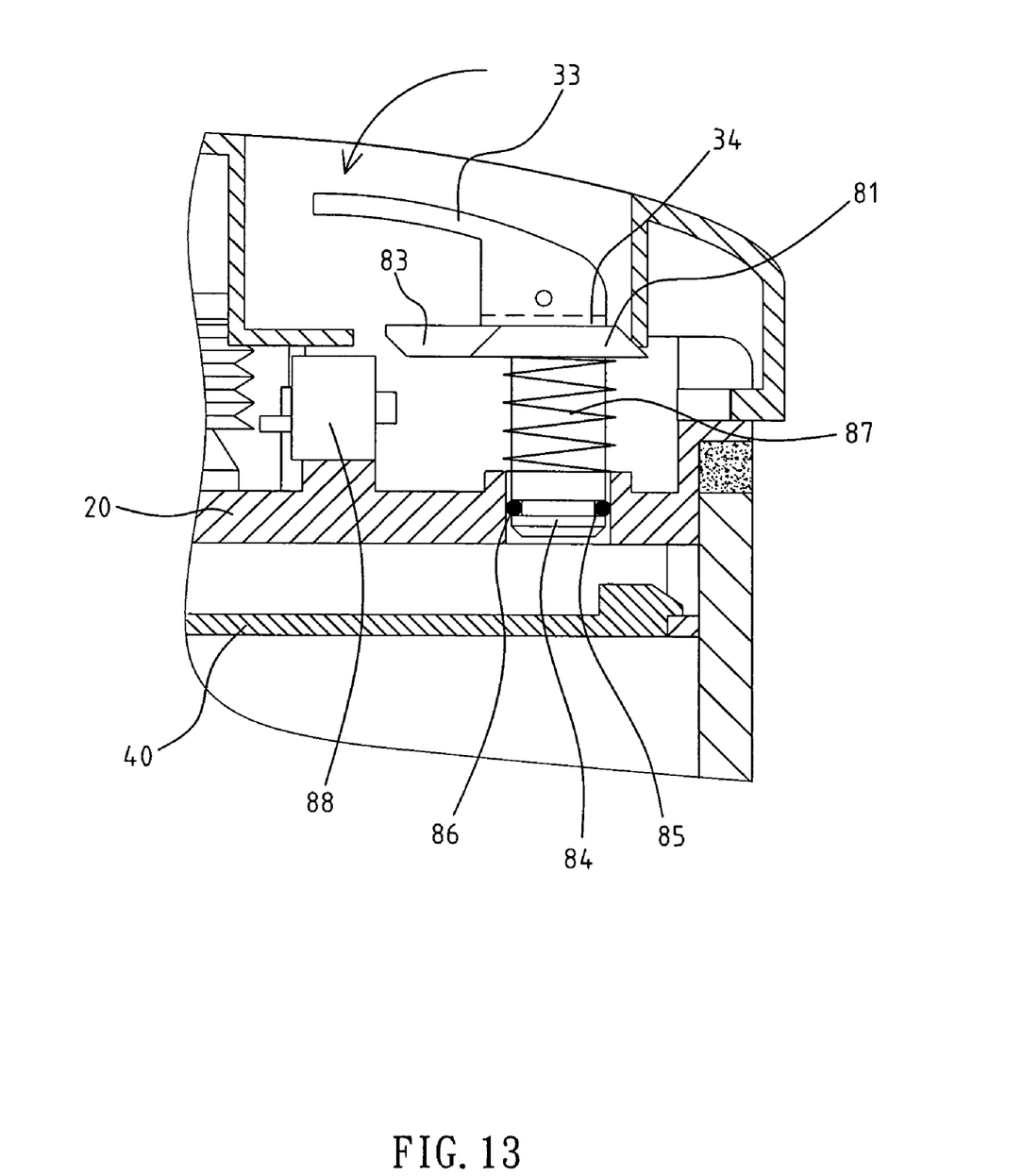
FIG. 13 shows another sectional view of the operation of the vacuum releaser of the present invention.

Referring to FIGS. 9, 12, and 13, when a user intends to open the container 90, the user must release the vacuum pressure due to the vacuum state of vacuum container 10. First, the user shall manually pull the discharger 33 of upper container 30 for bottom swinging. Then, the swinging discharger 33 will obliquely press down on the interlock 81. The guide post 84 of interlock 81 is provided with a sealer 86, which is tightly fitted into discharge hole 25 of middle container 20. When the discharger 33 presses down on the interlock 81, and guide post 84 of interlock 81 forces down, the sealer 86 on guide post 84 is separated from inner wall of discharge hole 25, such that the vacuum pressure of vacuum container 10 is released. And, when interlock 81 forces down, the trigger unit 83 of interlock 81 will trigger the switch 88 to cut off the power supply 50 of pumping unit 60. When the container 90 is covered, the discharger 33 can be manually rotated into an original state, such that the slideway 34 at the bottom of discharger 33 is horizontally placed. When the return spring 87 supports the interlock 81, the sealer 86 of interlock 81 will be tightly fitted into inner wall of discharge hole 25, such that vacuum container 10 is placed in an airtight state. Since the interlock 81 supports upwards, the trigger unit 83 of interlock 81 is separated from switch 88, such that power supply 50 can continue to drive pumping unit 60 for a normal operation.

I claim:

1. An apparatus comprising:

a vacuum container having an open end facing upwardly;

a container assembly mounted on said open end of said vacuum container, said container assembly having a middle container and an upper container, said middle container having a power supply fixer affixed at one side thereof and a suction pump fixer affixed to an opposite side thereof, said suction pump fixer having a suction hole at one side thereof, said middle container having a discharge hole and a detection hole positioned separately on one of the sides thereof, said upper container having a discharge fixer mounted thereto, said discharge fixer having a discharger fitted thereto;

a power supply received by said power supply fixer of said middle container;

a pumping unit received by said suction pump fixer of said middle container, said pumping unit having a suction pump and a suction pipe and a check valve, said suction pump connected in air-tight relation by said suction pipe and said check valve to said suction hole of said middle container;

a vacuum releaser positioned between said discharger of said upper container and said discharge hole of said middle container, said vacuum releaser operable for opening or closing said discharge hole, said vacuum releaser operable for switching said power supply on and off when said vacuum releaser is actuated; and a vacuum detector mounted onto said detection hole of said middle container, said vacuum detector operable for sensing a vacuum pressure within said vacuum container, said vacuum detector cooperative with said power supply so as to cut off said power supply when a desired vacuum pressure is sensed.

2. The apparatus of claim 1, said vacuum releaser having an interlock and a switch and a sealer and a return spring, said vacuum releaser having a trigger unit at one side of said interlock, said trigger unit being movable upwardly and downwardly so as to move said switch, said switch positioned on said middle container, said switch connected to said power supply so as to turn said power supply on or off, said interlock having a guide post at a bottom thereof, said guide post guidable through said discharge hole, said guide post having a circular groove formed thereon, said circular groove receiving a sealer therein, said sealer being tightly received against an inner wall of said discharge hole, said sealer being separable from said inner wall of said discharge hole when said discharge and said guide post are forced downwardly.

3. The apparatus of claim 2, said discharger having a slideway at a bottom thereof, said interlock having a guide groove at a top thereof, said guide groove positioned opposite to said slideway.

4. The apparatus of claim 1, said vacuum detector having a vacuum detector unit and a flexible pressure cylinder and a spring and a base and a circuit breaker, said circuit breaker positioned onto said middle container and cooperative with said power supply, said base fitted into said detection hole of said middle container, said base having a retractable part provided with a guide hole, said spring and said flexible pressure cylinder and said vacuum detector unit positioned on said base, said vacuum detector unit having an actuating end at one side thereof, said flexible pressure cylinder being closely fastened into said vacuum detector unit, said actuating end of said vacuume detector unit being movable downwardly so as to actuate said circuit breaker so as to cut off said power supply.

5. The apparatus of claim 1, said middle container having a plate affixed to a bottom thereof, said plate having a hole at a center thereof.

6. The apparatus of claim 1, said power supply being a battery.

7. The apparatus of claim 1, said upper container having a power supply side cover fitted thereto opposite said power supply.

* * * * *